Sept. 8, 1964
D. E. GUNLOCK ETAL
3,147,968
WIRE SPRING SEAT STRUCTURE
Filed Feb. 6, 1962
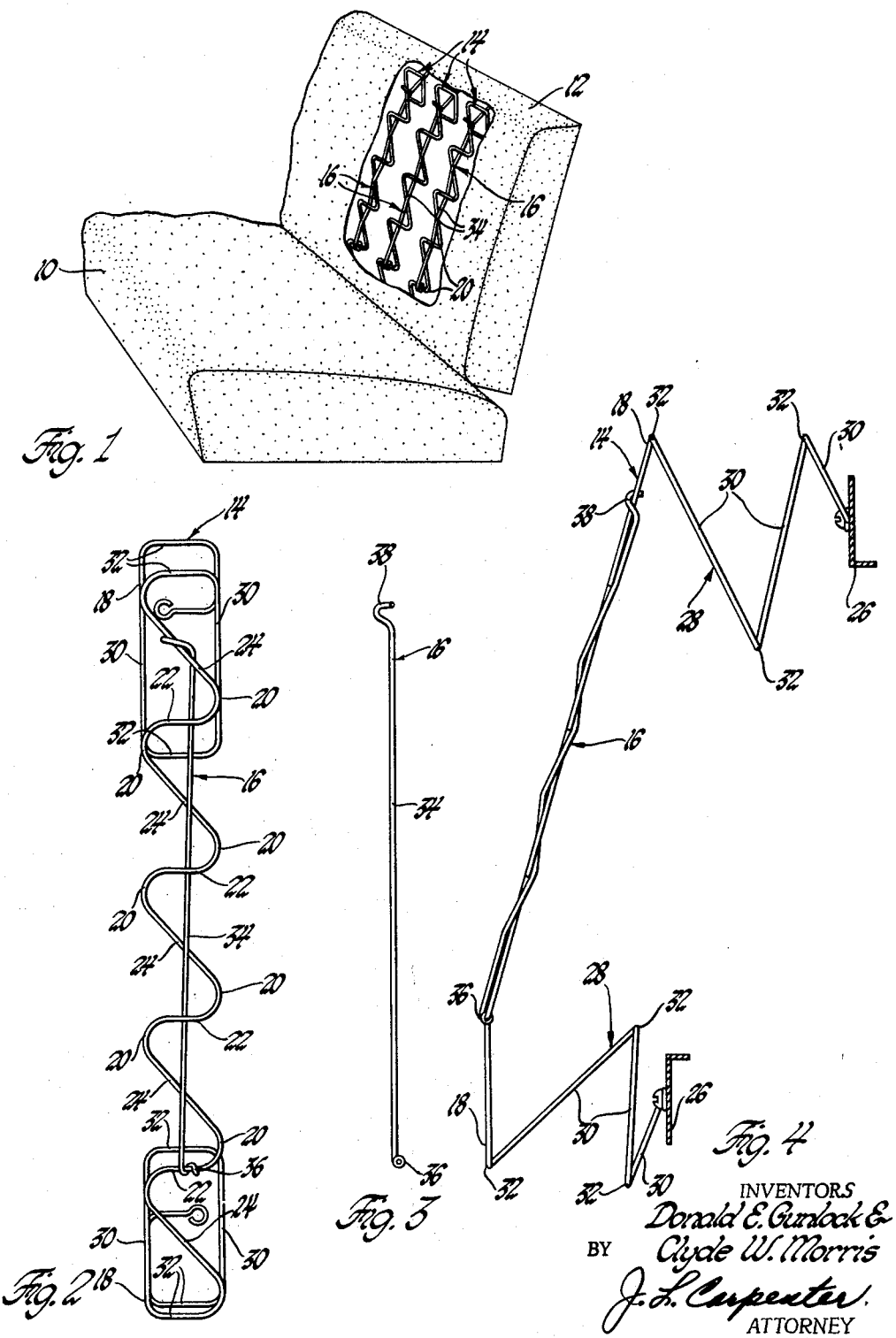
INVENTORS
Donald E. Gunlock &
BY Clyde W. Morris
J. L. Carpenter
ATTORNEY

United States Patent Office 3,147,968
Patented Sept. 8, 1964

3,147,968
WIRE SPRING SEAT STRUCTURE
Donald E. Gunlock, Birmingham, and Clyde W. Morris, Livonia, Mich., assignors to General Motors Corporation, Detroit, Mich., a corporation of Delaware
Filed Feb. 6, 1962, Ser. No. 171,504
4 Claims. (Cl. 267—105)

This invention relates to an improvement in a spring seat structure for motor vehicles assembled from sinuous or zig-zag shaped wire spring elements and more particularly to an auxiliary stiffener spring for increasing the yield resistance and providing improved support for the human body by the seat structure.

The present trend in automobile design is to lower the over-all silhouette of the automobile. To accomplish this, the roof line is generally lowered relative to the floor of the vehicle. This lowering of the roof requires a reduction of the available space for the seat and seat adjuster to provide enough room between the seat and the roof for the occupant. One area in which space can be saved is in the thickness of the seat. It is an object of the present invention to provide an auxiliary stiffener wire which is readily attached to the wire spring elements in such a manner that the wire spring structure will be reinforced but the height of the seat cushion will not be increased and in some instances may even be reduced in thickness while providing a comfortable seat cushion.

The present practice in seat construction is to provide an auxiliary spring to assist in the support of areas of heavier loads or portions of the seat that require stiffening. The present auxiliary spring generally requires special mounting anchors. It is a further object of the invention to provide an auxiliary stiffener wire which is inexpensive, easy to install and can be attached to the present wire spring elements without alteration of the seat structure.

In the drawings:

FIGURE 1 is a partially broken away perspective view of an automobile seat and back cushion in which the invention is applied to spring assemblies formed from rows of sinuous wire spring elements.

FIGURE 2 is a front elevational view of a Z-type wire spring seat structure with the invention mounted thereon.

FIGURE 3 is a side view of the novel spring stiffener wire.

FIGURE 4 is a side elevational view showing the spring stiffener wire interwoven with the loops of the wire spring seat element.

Referring now to the drawings, and particularly FIGURE 1, there is shown a seat 10 and seat back 12 wherein the cushion is constructed of a Z-type wire spring element 14 with the elongated stiffener wire 16 attached thereto.

Referring now to FIGURES 2, 3 and 4, the wire spring element 14 has a central supporting portion 18 formed by a series of left and right hand loops 20. The loops are connected by straight wire sections 22 and angular wire sections 24. The straight wire sections 22 being at substantially right angles to the longitudinal axis of the spring element 14 and the angular wire sections 24 being at an acute angle to the longitudinal axis. The spring element 14 is mounted on the seat frame 26 by screws or other suitable means. The supporting portion 18 is connected to the frame 26 by N-shaped support arms 28 which are formed by 3 downwardly inclined alternately opposed disposed bars 30 joined by lateral bars 32 to form conventional fish mouth sections as shown.

The stiffener wire member 16 is formed with a straight middle portion 34. One end 36 is bent 90° to the middle portion and spiraled 1¼ turns. The other end 38 is bent less than 90° from the middle portion and is further reversely bent ½ turn to form a hook portion.

The stiffener wire 16 is designed so that the spiral end 36 will attach to a straight wire section 22 of a Z-type wire spring element 14. The hook end 38 of the stiffener wire 16 is designed to attach to an angular wire section 24. The stiffener wire is interwoven across at least two wire sections not including the wire sections to which each end is anchored.

The stiffener wire 16 is designed for easy installation without any special tooling. First, the spiral end 36 is attached to a straight wire section 22 of the wire spring element 14. Then the straight middle portion 34 of the stiffener wire 16 is woven alternately above one angular wire section 24 and below one straight wire section 22 until the length to be stiffened has been covered. The hooked end 16 is then snapped over an angular wire section 24 to secure the stiffener wire 16 in place.

Referring now to FIGURE 4, when the stiffener wire 16 is in place the hooked end 38 can slide on the angular wire section 24. However, there is very little sliding due to the interwoven wires having a large amount of friction to counteract the sliding tendencies. When a load is applied to the spring, after the stiffener wire has been placed, the stiffener wire tends to prevent the expansion of the loops which it traverses. This tends to stiffen that portion of the wire covered by this stiffener wire and transfers the stresses further along the spring element beyond the section upon which the stiffener wire is mounted. The stiffener wire provides a firmer support in that area of the seat cushion to which it is applied.

While but one embodiment of the invention has been shown and described, it will be evident that numerous changes and modifications may be made therein. It is, therefore, to be understood that it is not intended to to limit the invention to the embodiments shown but only by the scope of the claims which follow.

We claim:

1. In a seat assembly, a spring seat construction comprising a frame and a plurality of wire spring seat elements each including an elongated sinuously corrugated supporting portion having a longitudinal axis and being formed by left and right handed loops successively connected by a straight wire section substantially at right angles to the longitudinal axis and by an angular wire section at an acute angle to the longitudinal axis and an elongated stiffener wire member having a substantially straight middle portion extending along the longitudinal axis and being interwoven with the loops of said supporting portion, one end of said stiffener wire member being attached to a straight wire section, and the other end of said stiffener wire member being attached to an angular wire section to effect a stiffening of said supporting portion while allowing sliding movement between said stiffener wire member and said supporting portion.

2. A seat assembly as claimed in claim 1, in which said one end of said elongated stiffener wire member is bent 90° from said middle portion and spiraled about its associated straight wire section.

3. A seat assembly as claimed in claim 1, having said other end of said elongated stiffener wire member bent at less than 90° from the middle portion and further reversely bent one half turn to form a hook portion and attaching said other end of said stiffener wire to its associated angular wire section of said supporting portion.

4. In a seat assembly, a spring seat construction comprising a seat frame, a plurality of wire spring seat elements, each of said wire spring seat elements including an elongated sinuously corrugated supporting portion having a longitudinal axis therethrough and support arms extending from opposite ends thereof, said supporting portion being formed by alternate left and right handed loops connected alternately by a short transverse straight wire section at substantially right angles to the longitudinal axis and by a longer angular wire section at an acute angle to the longitudinal axis, and an elongated stiffener wire member formed from straight wire comprising a substantially straight middle portion, an end portion bent 90° from the middle portion and spiraled 1½ turns being connected to a short straight wire section of said supporting portion, said middle portion being interwoven with a plurality of said straight wire sections and angular wire sections by being alternately positioned above an angular wire section and below a straight wire section and extending substantially parallel to the longitudinal axis and an end portion which is bent at less than 90° from said middle portion and further reversely bent one half turn to form a hook, said hook coacting with one of said angular sections to anchor said stiffener wire member to said supporting portion to effect a stiffening of said supporting portion while allowing sliding movement between said stiffener wire member and said supporting portion.

References Cited in the file of this patent

UNITED STATES PATENTS

| | | |
|---|---|---|
| 2,249,048 | Sandor | July 15, 1941 |
| 2,257,367 | Berstein | Sept. 30, 1941 |
| 2,835,316 | Neely | May 20, 1958 |
| 2,855,985 | Neely | Oct. 14, 1958 |